United States Patent
Maimon et al.

(10) Patent No.: US 6,480,265 B2
(45) Date of Patent: Nov. 12, 2002

(54) ACTIVE TARGET DISTANCE MEASUREMENT

(75) Inventors: Shimon Maimon, Rochester, NY (US); Eli Benoliel, Zickron Yaakov (IL)

(73) Assignee: Deep Optic Ltd., Yokneam (IL)

( * ) Notice: Subject to any disclaimer, the term of this patent is extended or adjusted under 35 U.S.C. 154(b) by 0 days.

(21) Appl. No.: 09/816,736

(22) Filed: Mar. 26, 2001

(65) Prior Publication Data

US 2002/0135749 A1 Sep. 26, 2002

(51) Int. Cl.[7] .................................................. G01C 3/08
(52) U.S. Cl. ...................... 356/4.07; 356/4.02; 356/5.1
(58) Field of Search ...................... 356/4.07, 5.03–5.05, 356/141.1

(56) References Cited

U.S. PATENT DOCUMENTS

| 4,895,440 A | * | 1/1990 | Cain et al. | |
| 4,935,613 A | * | 6/1990 | Ishiguro et al. | 250/201.1 |
| 5,835,204 A | * | 11/1998 | Urbach | 356/5.01 |
| 6,091,905 A | * | 7/2000 | Yahav et al. | 396/106 |
| 6,137,566 A | * | 10/2000 | Leonard et al. | 356/141.1 |
| 6,323,942 B1 | * | 11/2001 | Bamji | 356/5.01 |

* cited by examiner

*Primary Examiner*—Stephen C. Buczinski
(74) *Attorney, Agent, or Firm*—G. E. Ehrlich Ltd.

(57) ABSTRACT

Apparatus for determining a distance of a target, the apparatus comprising a pulse transmitter, a gatable beam detector, and a comparator, the gatable beam detector being operable to obtain gated and calibration beam energy information of a pulse transmitted by the beam pulse transmitter for reflection from the target, and to pass the beam energy information to the comparator, thereby to obtain a ratio between the gated and the calibration beam energy, the ratio being inversely proportional to the distance. Also an array thereof for simultaneously obtaining distances of a multiplicity of points of a three-dimensional object in real time, in particular to obtain movement information of the target.

15 Claims, 6 Drawing Sheets

ACTIVE TARGET DISTANCE MEASUREMENT

FIELD OF THE INVENTION

The present invention relates to active target distance measurement and more particularly but not exclusively to active distance measurement to a target using reflection of electromagnetic pulses.

BACKGROUND OF THE INVENTION

Distance measurement to a target object is necessary for a wide range of applications. Methods for distance measurements include both active and passive methods. Passive methods are generally based on the observation of the object to be measured from at least two points and then calculation based on the observations using triangulation techniques. Active methods generally involve reflecting a beam from the object and measuring the time delay in the round trip. The distance may then be calculated using the identity speed=distance/time.

In this case, distance=beam speed×measured delay/2.

The measured delay is referred to hereinbelow as Time of Fly.

Other methods measure the phase of the transmitted pulse in order to determine the distance.

The time of fly method requires extremely high measurement accuracy and thus relatively complex electronics. It is thus impractical to produce time of fly based apparatus as an array to obtain spatial information from a plurality of points on an object. For applications such as robotics and robot navigation, and for multimedia applications, distance to a given point needs to be known from many points of a three dimensional object.

Currently, obtaining three dimensional location information of an object is possible using two cameras whose intervening distance is known in three dimensions, and then carrying out triangulation, generally separately for each dimension. However, such a method requires considerable calculation and is difficult to carry out in real time.

SUMMARY OF THE INVENTION

The present embodiments overcome the problem of the prior art by measuring the energy of the reflected beam over a gating interval to produce a gated energy. The gated energy is compared with a calibration energy to produce a ratio which is inversely proportional to the object distance.

Energy of a beam is the integral of the brightness or amplitude of the beam and is a measurement which can easily be obtained from a detector such as a charge coupled device (CCD).

According to a first aspect of the present invention there is provided a method of measuring distance to a target comprising reflecting a pulse off a target, retrieving energy from the reflected pulse over a predetermined gating period and measuring a level of the retrieved energy, determining a distance of the target by comparing the measured retrieved energy level from the target over the predetermined gating period with a calibration energy level.

Preferably, the method comprises carrying out the step of retrieving at each one of a plurality of sensors.

Preferably, the step of retrieving energy comprises detecting a brightness of the reflection and integrating the brightness over the predetermined gating period.

Preferably, the predetermined gating period is a length of the pulse.

Preferably, the step of determining comprises forming a ratio between the calibration energy level and the gated energy, which ratio is inversely proportional to the distance.

Preferably, the duration of the pulse is set at a time taken by light to travel the maximum distance it is intended to measure.

Preferably, the calibration is carried out by measuring a total energy of a pulse reflected from the object.

Preferably, the calibration and the gated energy retrieval are carried out on a single reflected pulse.

Preferably, the method comprises a step of splitting the reflected pulse into two, one part being used for calibration energy retrieval and one part being gated for gated energy retrieval.

Preferably, two successive pulses are reflected one after the other, a first beam being used for calibration energy retrieval and the second being gated for gated energy retrieval.

Preferably, the method comprises splitting incoming light into two parts, one part for analysis of the reflected pulse to determine distance information and a second part being used to obtain image information.

Preferably, the image information is color information.

Preferably, the pulse is any one of a group comprising a light beam, an ultra-violet beam, an infra-red beam, a microwave beam and an ultra-sound beam.

According to a second aspect of the present invention, there is provided apparatus for determining a distance of a target, the apparatus comprising a pulse transmitter, a gatable beam detector, and a comparator, the gatable beam detector being operable to obtain gated and calibration beam energy information of a pulse transmitted by the beam pulse transmitter for reflection from the target, and to pass the beam energy information to the comparator, thereby to obtain a ratio between the gated and the calibration beam energy, the ratio being inversely proportional to the distance.

Preferably, the pulse beam transmitter is operable to transmit a pulse having a predetermined width and the gatable beam detector is operable to be gated at at least twice the predetermined width and at the predetermined width, thereby to produce a total reflected energy of the pulse for the calibration energy, and the gated pulse energy.

Preferably, the detector comprises two sub-detectors, one gated at the at least twice the predetermined width and the other gated at the predetermined width.

The apparatus preferably comprises a beam splitter for splitting the reflected pulse between the first and the second sub-detectors.

The apparatus preferably comprises a beam splitter for splitting light incoming to the apparatus between a first sub-detector gated to obtain distance information and a second sub-detector for obtaining general image information.

The apparatus preferably comprises compensation factors to correct for built-in errors.

Preferably, the detector is part of an array of detectors.

Preferably, the array is a three-dimensional array.

According to a third aspect of the present invention there is provided an array of distance sensors for sensing distance to multiple points of a target object by detecting pulses reflected off a target object, each sensor comprising a gatable detector for detecting incident energy levels of said pulses to produce an output indicative of the distance of a respective point.

Preferably, the sensor is gatable to a time delay equaling at least twice of a length of the pulse to obtain a calibration energy, and the sensor is further gatable to a time delay equaling a length of the pulse to obtain an energy level indicative of the distance.

BRIEF DESCRIPTION OF THE DRAWINGS

For a better understanding of the invention, and to show how the same may be carried into effect, reference will now be made, purely by way of example, to the accompanying drawings, in which.

DESCRIPTION OF THE PREFERRED EMBODIMENTS

Figure 1:
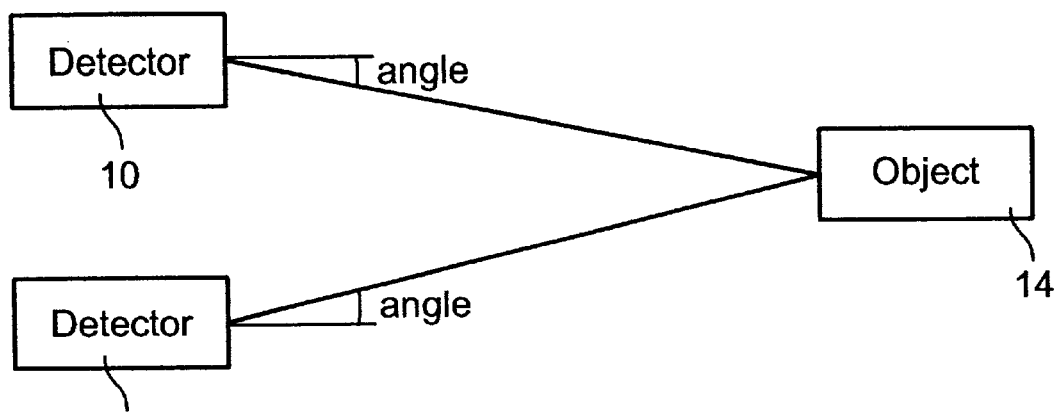
FIG. 1 is a schematic diagram showing a prior art distance measuring system.

Reference is now made to FIG. 1, which is a generalized diagram showing a prior art passive detection system in which two passive detectors 10 and 12 observe an object 14. The angles between each of the detectors and the object is fed into a triangulation calculation and the distance of the object from a point between the two detectors 10 and 12 is determined.

Figure 2:
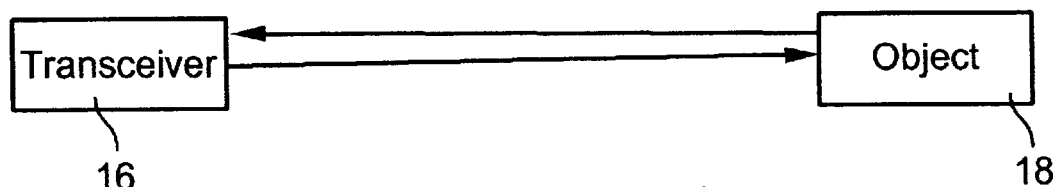
FIG. 2 is a schematic diagram showing a second prior art distance measuring system.

Reference is now made to FIG. 2, which is a generalized diagram showing a prior art active detection system in which a transceiver 16 transmits a beam towards an object 18. The beam is reflected off the object 18 and the reflection is received by the transceiver 16. The time delay between the sending and the receiving of the signal is used to determine the distance of the object 18 from the transceiver 16 using the time of fly identity referred to above.

Figure 3:
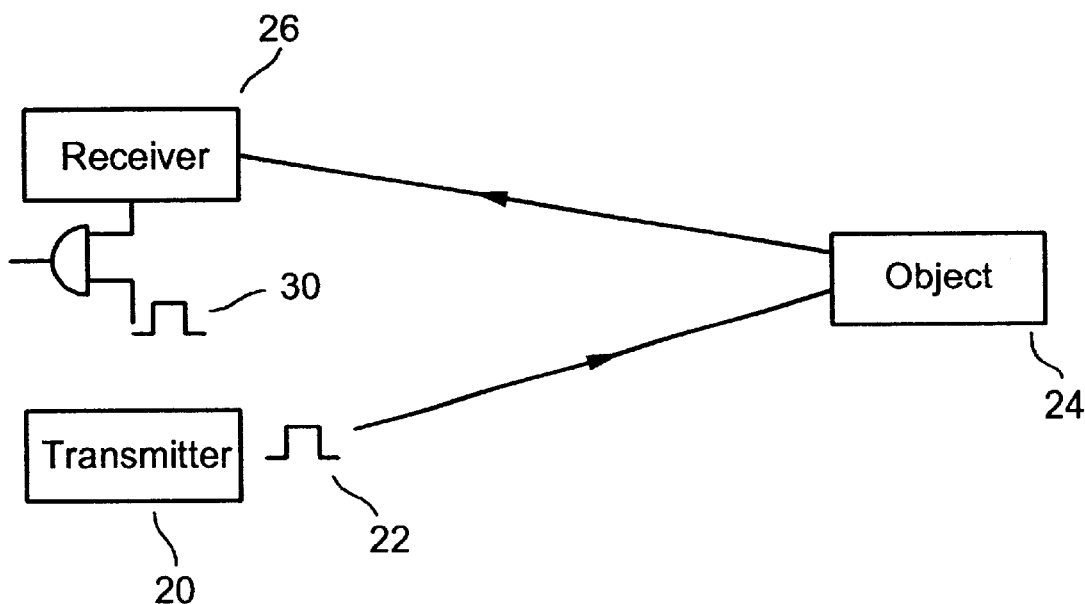
FIG. 3 is a simplified schematic diagram showing a first embodiment of an energy based distance measuring system operable in accordance with a first embodiment of the present invention.

Reference is now made to FIG. 3, which is a generalized diagram showing a first embodiment of the present invention. A transmitter 20, which may typically be an infra-red diode, a laser diode, an ultrasonic transducer or an RF or microwave transmitter, emits a pulse 22 towards an object 24. The pulse 22 is reflected, by the object 24, over a range of directions such that a particular signal energy is emitted in any given direction. The distance of the object 24 defines a beam path from the transmitter 20 via the object 24 to the receiver 26 and the length of the beam path defines a delay of the pulse. The total energy of the reflected beam, as received by the receiver, depends on numerous factors including the reflectivity of the surface of the object 24, the presence of reflecting bodies such as dust bodies in the beam path etc.

As will be described below, the total energy of a reflected beam is compared against energy reflected from the beam gated timewise using a gating device 30, so that an energy ratio between the ungated and gated beam gives an indication of the distance of the object.

Figure 4:
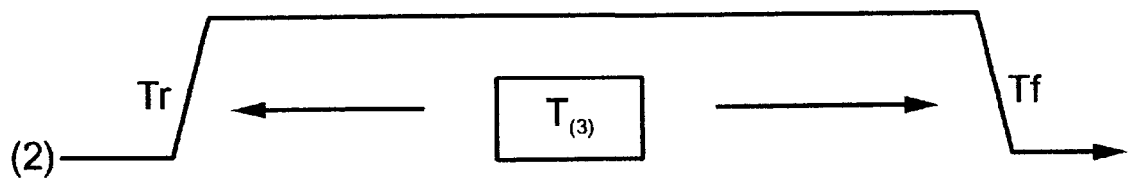
FIG. 4 is a simplified graphical diagram of a pulse for use in the embodiment of FIG. 3.

Reference is now made to FIG. 4, which shows a square wave pulse 22, suitable for use as the square wave pulse 22 of FIG. 3. The pulse preferably has a known rise time Tr, a known fall time Tf and a known duration T.

Returning now to FIG. 3, and a receiver 26 is placed at a given angle from the object. The receiver 26 may comprise a detector compatible with the transmitter 20. For example if the transmitter is a laser diode then the detector may be a photodiode. The receiver 26 picks up the particular signal energy emitted in its respective direction. The particular signal energy may be determined by integrating the received signal. Alternatively, a separate step of integration may not be required, in particular if the detector is a CCD whose output is proportional to the input energy level. The time of arrival of the signal will be in accordance with the above referred to time of fly. If the distance is already approximately known then the approximate time of fly is also known.

In a first embodiment of the present invention, a first pulse 22 is transmitted towards the object and reflected. The pulse is gated over a gating width which is preferably twice the width of the pulse so that all of the reflected pulse energy is measured. The gating interval preferably starts at zero, and the pulse width is preferably chosen such that the travel time to a target at a maximum distance to be measured equals the pulse width duration.

The energy measured over the gating interval is preferably taken as a calibration energy level, and this first pulse is referred to as the calibration pulse.

Figure 5:
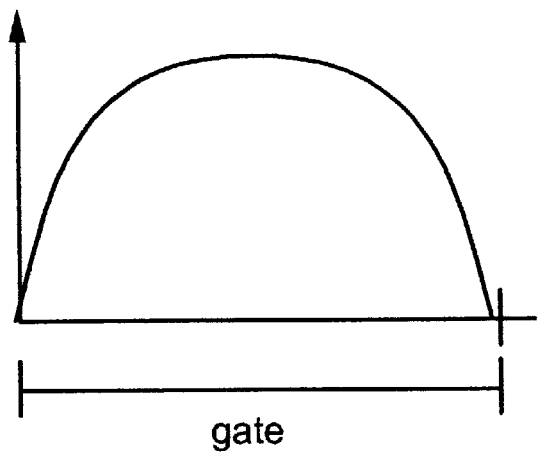
FIG. 5 is a simplified graphical diagram of amplitude against time of a slightly distorted pulse as may be received following reflection of a pulse of the type shown in FIG. 4 from a very nearby object, the pulse being gated by gating signal shown along the bottom of the graph.

Reference is now made to FIG. 5, which is a time—amplitude graph showing a slightly distorted but otherwise idealised received signal which is an echo of the transmitted pulse. It will be appreciated that the amplitude of the received signal is likely to be considerably lower in any given direction as the energy of the originating pulse is diffused in three dimensional space.

Figure 6:
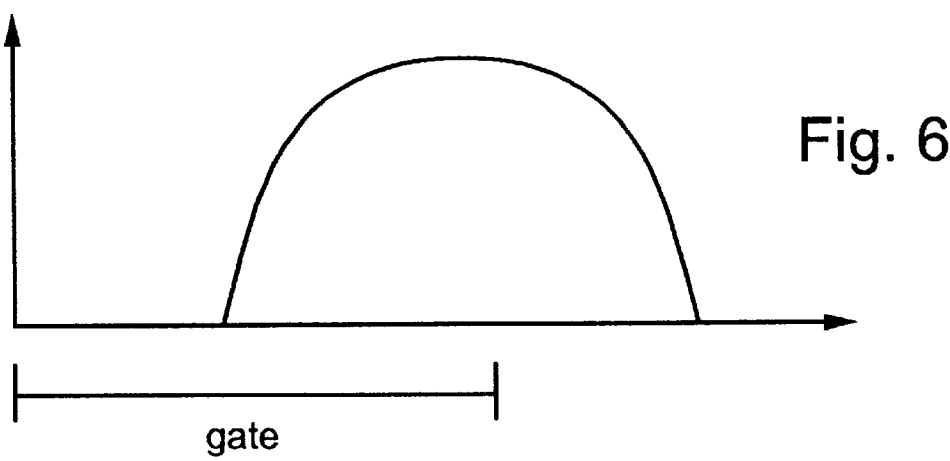
FIG. 6 is a simplified graphical diagram of amplitude against time of the pulse shown in FIG. 5, reflected from a more distant object and thus delayed with respect to the gating signal.

Returning again to FIG. 3 and a further pulse 22 is transmitted, but this time the received signal is gated against a narrow timing signal 30, as shown graphically in FIGS. 5 and 6. Preferably, this time, the gate duration is equal to the pulse duration so that the total received energy depends on any offset between the gate period and the duration of receipt of the pulse, i.e. the delay due to the time of flight. The gating signal is preferably aligned so that for a distance of zero, the full energy of the pulse is received (FIG. 5) but as the object recedes the pulse is more and more delayed so that less and less of the pulse is aligned with the gating signal (FIG. 6). Consequently, less and less of the energy of the pulse is received.

A ratio of the energies of the two pulses (the calibration pulse and the gated pulse) is determined, the ratio being inversely proportional to the distance of the object. For example, in the case in FIG. 5 the ratio would be 1:1, indicating a distance of zero. In FIG. 6, by contrast the offset is such that the gate duration covers only the first 50% of the period of receipt of the pulse. Thus the total received energy is 50% of the energy received from the first pulse. The detected ratio is two to one and the distance of the object may thus be determined.

Figure 7:
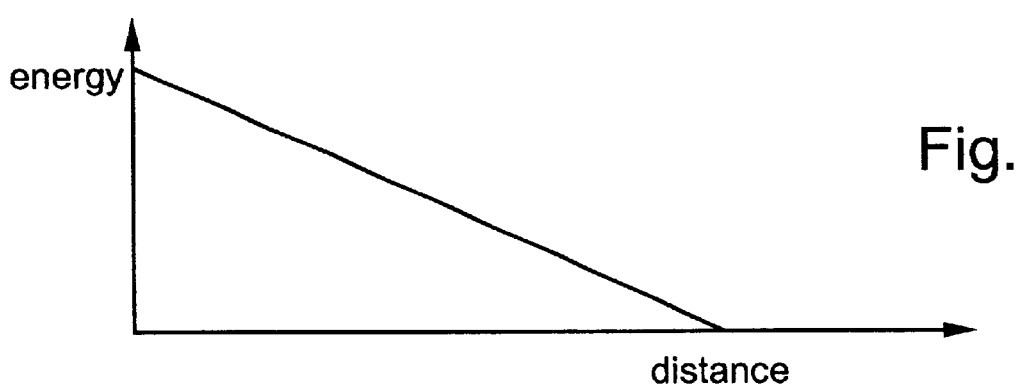
FIG. 7 is a simplified graphical diagram of received energy ratio against distance of an object for a reflected pulse which has been gated using a fixed gating signal.

Reference is now made to FIG. 7, which shows the variation in received signal energy over a fixed gating period as the distance to an object changes. As the distance of the object varies, the timing of receipt of the echoed pulse varies and the ratio of the gated and ungated signals is inversely proportional to the distance.

The measurement of the pulse energy and the creation of the ratio is a relatively easy operation requiring simpler electronics than that required for measuring actual delays in the pulse as done in the prior art. The present invention is therefore suitable for measuring distances over numerous points of three dimensional objects to build three-dimensional images, as will be explained in more detail below.

Figure 8:
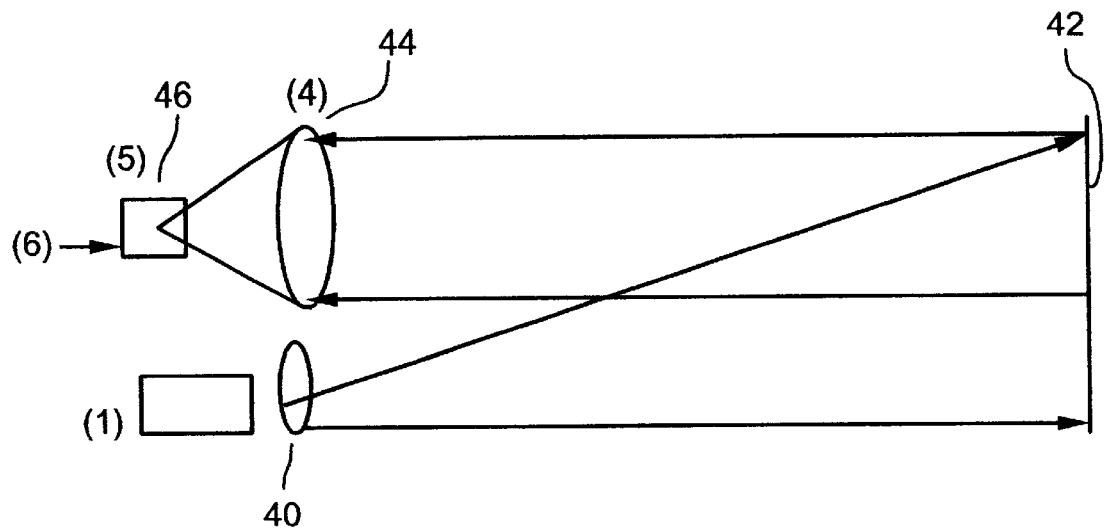
FIG. 8 is a simplified schematic diagram of a device according to the embodiment of FIG. 3, adapted for use with an optical pulse.

Reference is now made to FIG. 8, which is a simplified diagram showing an implementation of the embodiment of FIG. 3 adapted for use with an optical pulse. In the diagram of FIG. 8, a transmitter 40, for example a laser diode, emits a pulse 22 which strikes an object 42 over a surface thereof. As will be appreciated the surface is not a point surface but is rather part of a three-dimensional shape. The signal is reflected and strikes a lens 44 where it is focused onto a detector 46. The detector 46 preferably comprises a plurality of individual detection pixels, onto each of which is focused light from a different point on the object surface.

Substantially the total energy that arrives at the lens 44 is focused onto the detector 46.

A first or calibration pulse is preferably gated with a gating signal which is at least twice the pulse duration T, so as to obtain a calibration energy level reflected in the given direction. The pulse width is set to correspond to the time of flight to the maximum distance to be measured and the initial gating period is set to twice the thus determined pulse width. This first pulse gives target reflection information, that is to say it tells us about the total reflection information in the given direction.

A second pulse is then transmitted and preferably gated at the receiver with a gating signal which is only the length of the pulse duration. A ratio is formed, as described above, of the two energies, and a distance to the object is inferred therefrom. Each pixel thus receives both calibration and measurement pulse energy from the same point on the surface. The two pulses are preferably close together so that even if the target moves, the energy received is still substantially from the same point.

In the case of a fast moving target, the received signal may contain the difference between two continuous pulses. The distance may thus be determined by the ratio between the two received energy levels multiplied by the wave speed.

In order to improve the accuracy of the measurement it is preferable to make use of correction tables and constants as will be well known to the skilled man. This may correct for the speed of certain of the electronic components, gate time setting and the like.

Figure 9:
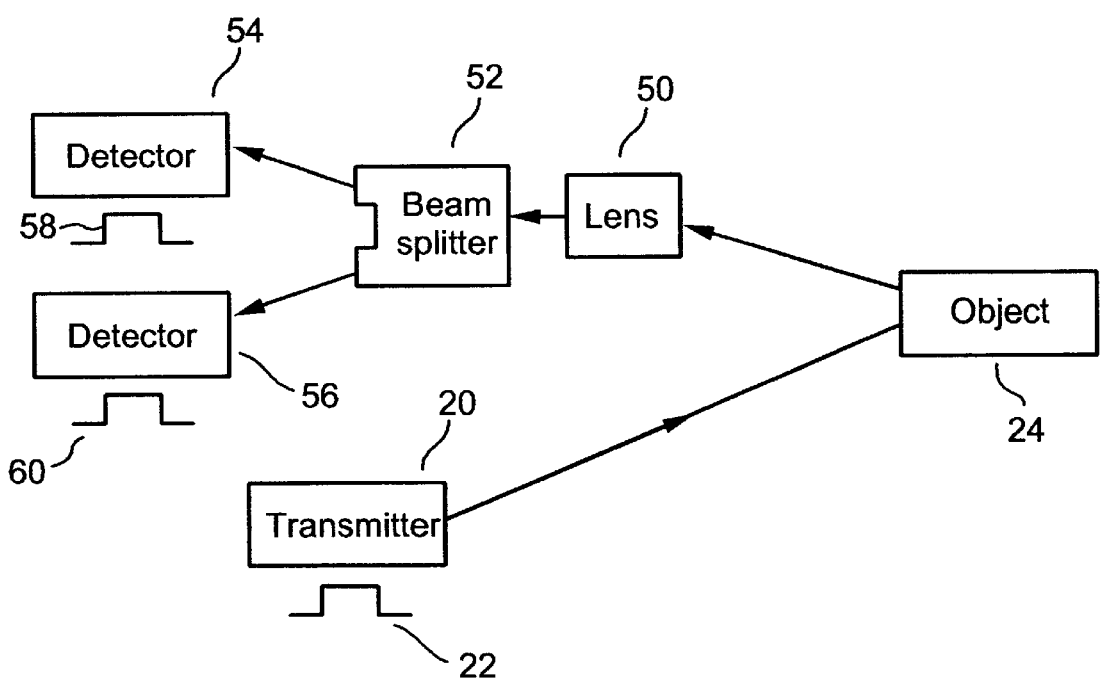
FIG. 9 is a simplified block diagram of a device for distance determination according to a further embodiment of the present invention.

Reference is now made to FIG. 9, which is a simplified schematic diagram showing a further embodiment of the present invention. Parts which are the same as those previously discussed are given the same reference numerals and are not described again except as necessary for an understanding of the present embodiment. A transmitter 20 emits a single pulse 22 as before at an object 24. The beam 22 is reflected from the object in a plurality of directions and the part of the beam energy that is transmitted in a given direction is picked up by a lens 50. The lens passes the energy to a beam splitter 52 where it is split into two and sent to two separate detectors 54 and 56, for correlation and measurement respectively. The energy is detected in full by the correlation detector 54, gated by a gating signal 58 that is at least twice as long as the pulse length, as described above. The measurement detector 56 at the same time gates the reflected signal with a gating signal 60 having a width that is the same as the length of the pulse, as described in the previous embodiment in respect of the second pulse. The ratio of the energies detected by each of the detectors 54 and 56 respectively may be used to determine the position of the object, as in the previous embodiment.

Thus, a single pulse serves both for calibration and distance measurement, and the distance of the object 24 from the detector 50 may be obtained following reflection of just a single pulse.

Figure 10:
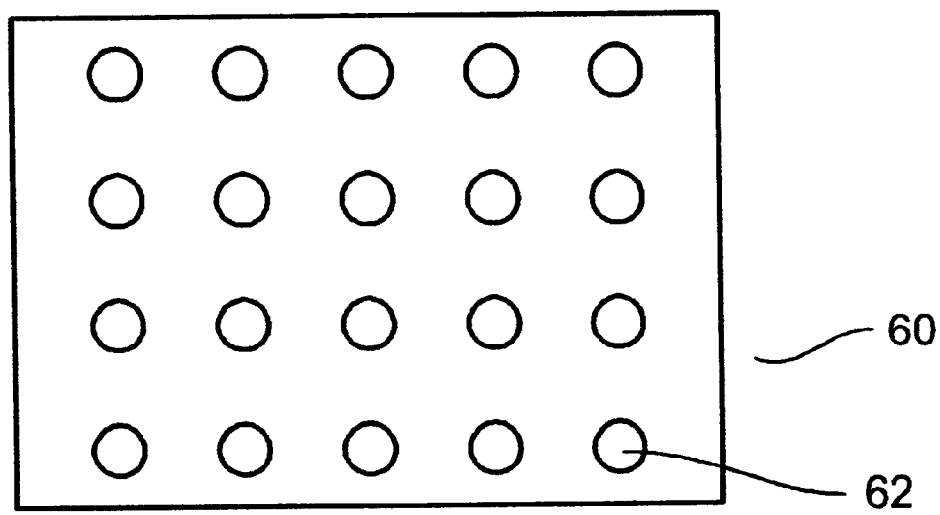
FIG. 10 is a simplified block diagram of an array of distance sensors for use with any of the above-mentioned embodiments.

Reference is now made to FIG. 10, which is a simplified schematic diagram showing a further embodiment of the present invention. In the embodiment of FIG. 10, in place of the single receiver 26 there is provided an array 60 of receivers or sensors 62. Although the array is here shown as flat it is appreciated that the sensors may be placed in a three-dimensional array around the area of the object. In the array 60, each sensor 62 independently detects reflections of the beam by the object, so as to obtain distances to a plurality of points on the surface. Thus an array of distances are detected giving positions of different parts of the object and allowing a three-dimensional model of the object to be obtained. Substantially the only tasks that are necessary are two integrations and the calculation of a ratio for each sensor 62.

The array of FIG. 10 may be used in conjunction with the two-pulse measurement described in respect of FIG. 3 or in conjunction with the one-pulse method described in respect of FIG. 9. The sensors used in the array may be CCD based or CMOS based or may use any other suitable technology. Gating may be carried out using a fast optical shutter or the fast electronic shutter schematically represented in FIG. 3.

Figure 12:
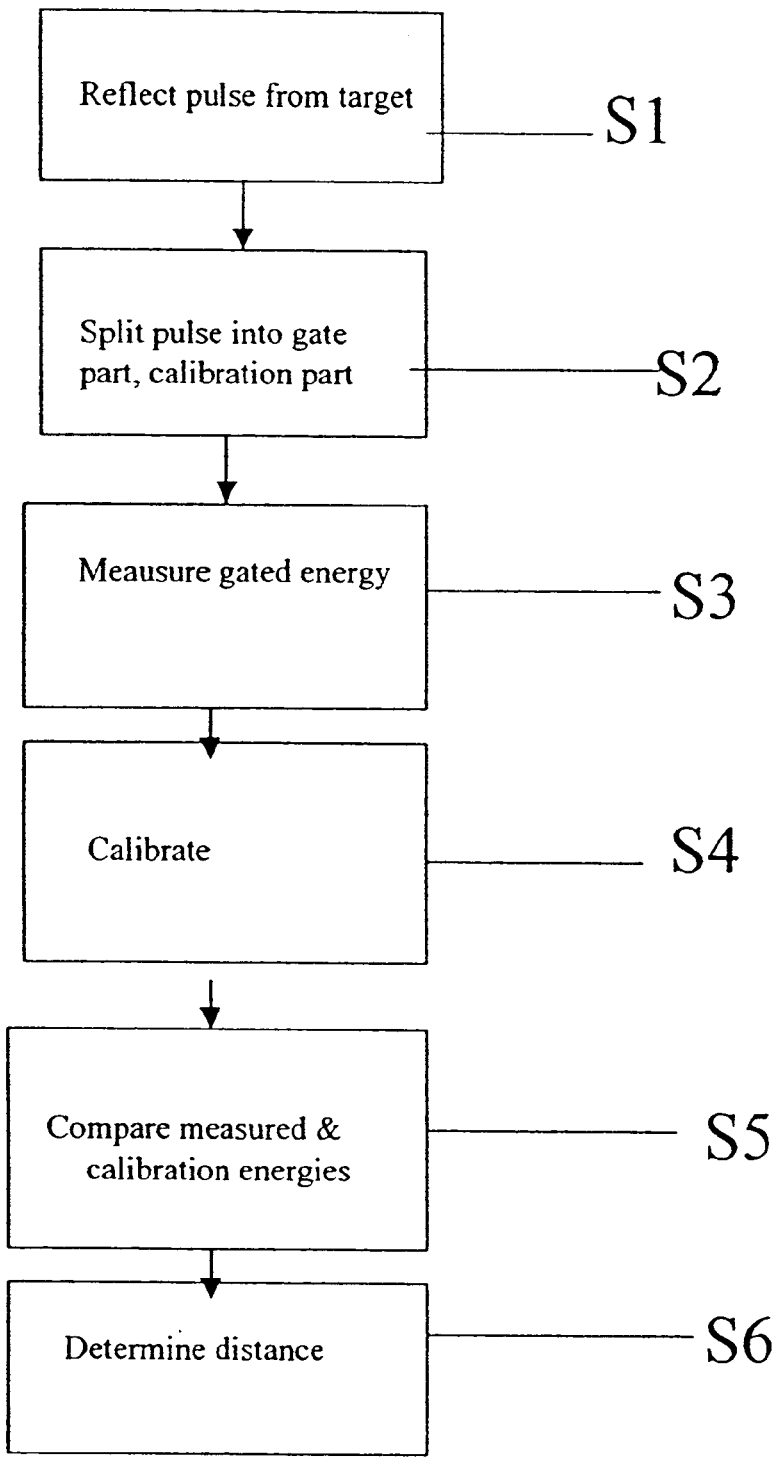
FIGS. 12 and 13 are simplified flow charts showing two variations of a distance measuring method according to embodiments of the present invention.

Reference is now made to FIG. 12, which is a simplified flow chart showing a distance measuring method according to an embodiment of the present invention. The method comprises a step S1 of reflecting a pulse off a target, a step S2 of splitting the reflected pulse into two, one part being used for a calibration energy retrieval and one part being gated for a gated energy retrieval. A step S4 is then carried out of retrieving energy of the gating part from the reflected pulse over a predetermined gating period and measuring a level of the retrieved energy. A step S5 is carried out of comparing the measured retrieved energy level from the target over the predetermined gating period with a calibration energy level. A step S6 is then carried out of determining a distance based on the comparison.

Figure 13:
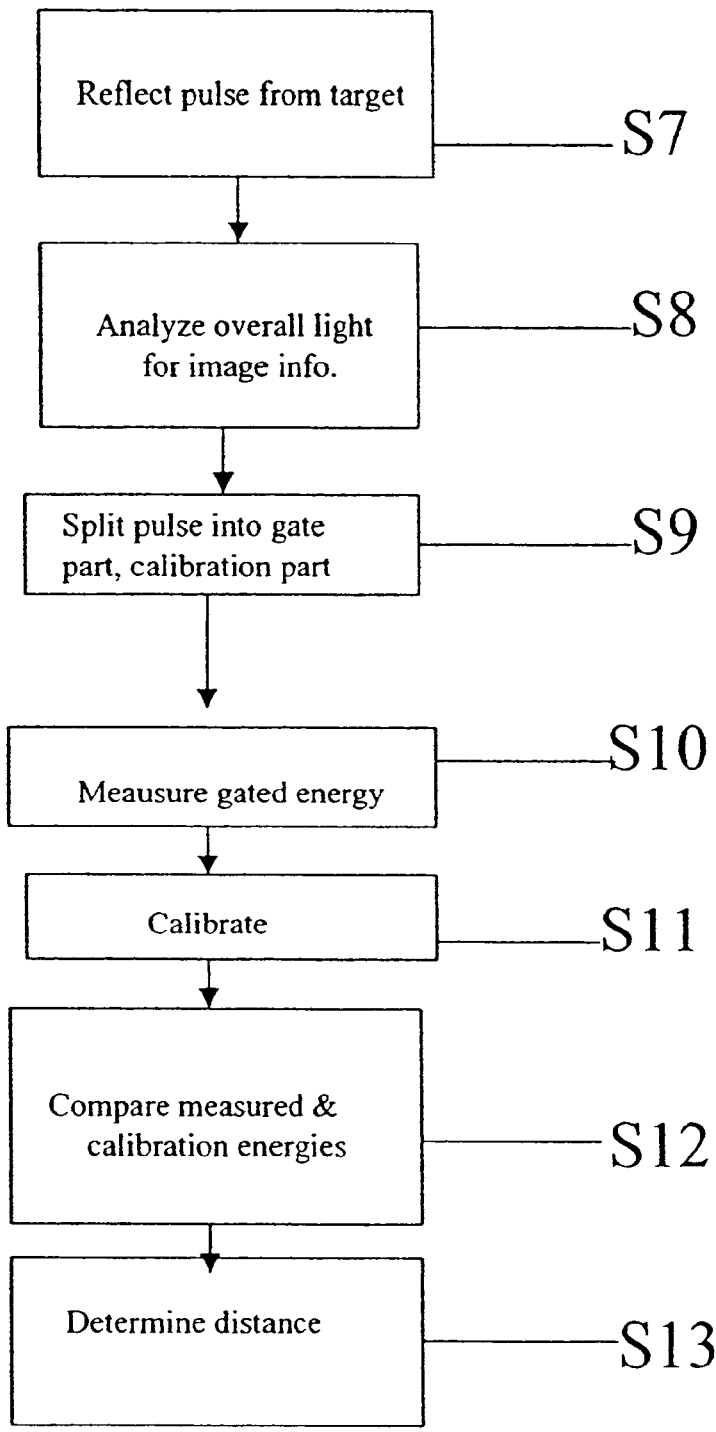

Reference is now made to FIG. 13, which is a simplified diagram of a method of determining a distance at the same time as analyzing image information. The method comprises a stage S7 of reflecting a pulse off a target, a stage S8 of analyzing all of the received light for determining image information, it being borne in mind that the pulse light is not the only light being used to illuminate the target. Stage S8 in fact comprises splitting the incoming light into two parts, one part for analysis of the reflected pulse to determine distance information and a second part being used to obtain image information. A stage S9 involves splitting the pulse light into gating and calibration parts as for FIG. 12 above. A stage S10 of measuring the gated information follows, and then a stage S11 of calibration. In a stage S 12 a comparison is carried out between the measured gated and calibration energies, and then there follows a stage S13 of determining a distance of the target, using the comparison information.

Figure 11:
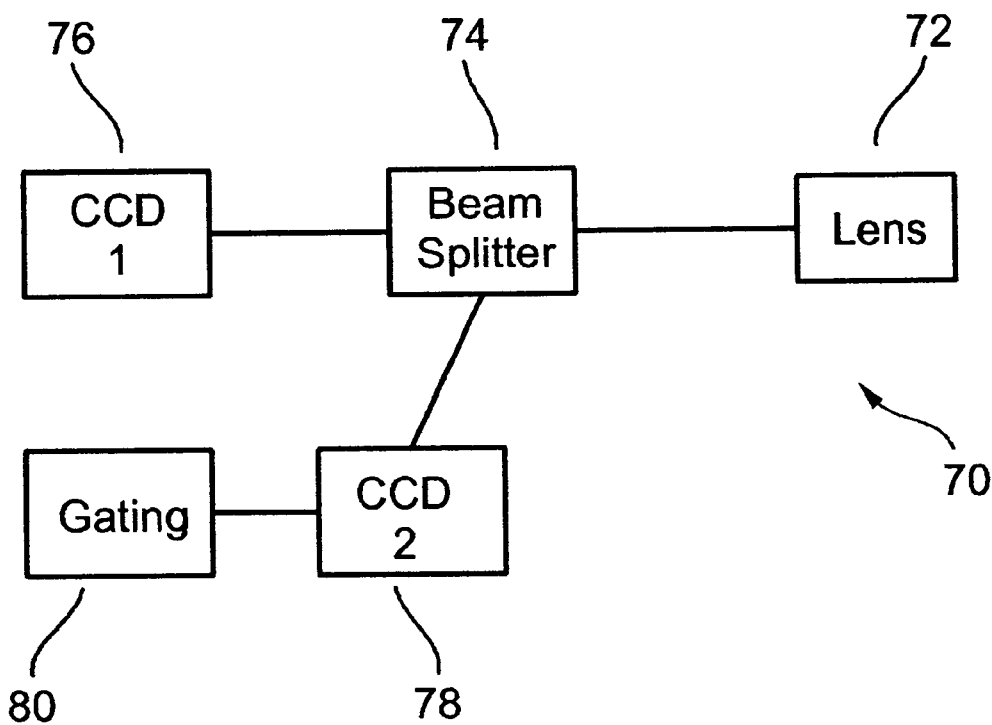
FIG. 11 is a simplified block diagram of a device for obtaining both an image and a distance measurement of a three-dimensional object.

Reference is now made to FIG. 11, which is a simplified block diagram showing a further embodiment of the present invention, adapted both to image an object and to obtain distances of points on a surface thereof. A combined imager and distance measurer 70 comprises a lens 72, a beam splitter 74, a first CCD array detector 76 and a second CCD array detector 78. The second CCD array detector is preferably connected to a gating arrangement 80 operable to provide gating signals of the kind mentioned in the preceding embodiments.

The beam splitter 72 is operable to split incoming light so that the majority of the incoming light is routed to the first CCD 76 which carries out regular imaging. The first CCD 76 is preferably continuously operable. During operation of the distance measuring pulse, the beam splitter 72 passes some of the light to the second CCD array 78, where gating is carried out as with the embodiment of FIG. 9 to determine the distance of points on the surface of an object.

The beam splitter may continuously send light to both CCD arrays. In a preferred embodiment, however, it may be an electronically operated active beam splitter which sends all light to the first array 76 most of the time but sends some or all of the light to the second array when the distance measuring pulse is active. Generally, even with continuous measurement, the pulse is active only a small fraction of the time.

An alternative to the device of FIG. 11 may use a single array for both imaging and distance measurement by using incoming color information to generate an image but using black and white information in energy measurement of the reflected pulse.

There is thus provided a method and apparatus for providing three-dimensional depth information of an object, including a moving object. The method uses calculations based on energy, that is to say on the integrals of received signals, and specifically the ratio between the energies of a time gated measurement and a calibration measurement. This makes the method more robust to inaccuracies. Embodiments provide a method and apparatus for obtaining distance information to a plurality of points on a three-dimensional object, relatively inexpensively and using a single relatively compact detector.

It is appreciated that features described only in respect of one or some of the embodiments are applicable to other embodiments and that for reasons of space it is not possible to detail all possible combinations. Nevertheless, the scope of the above description extends to all reasonable combinations of the above described features.

The present invention is not limited by the above-described embodiments, which are given by way of example only. Rather the invention is defined by the appended claims.

We claim:

1. A method of measuring distance to a target comprising:
   reflecting a pulse off a target,
   splitting said reflected pulse into two, one part being used for calibration energy retrieval and one part being gated for gated energy retrieval;
   retrieving energy from said reflected pulse over a predetermined gating period and measuring a level of said retrieved energy,
   determining a distance of said target by comparing said measured retrieved energy level from said target over said predetermined gating period with a calibration energy level.

2. A method according to claim 1 comprising carrying out said step of retrieving at each one of a plurality of sensors.

3. A method according to claim 1 wherein said step of retrieving energy comprises detecting a brightness of said reflection and integrating said brightness over said predetermined gating period.

4. A method according to claim 1 wherein said predetermined gating period is a length of said pulse.

5. A method according to claim 4 wherein said step of determining comprises forming a ratio between said calibration energy level and said gated energy, which ratio is inversely proportional to said distance.

6. A method according to claim 5, comprising setting a width of said pulse as a time taken by light to travel to a maximum distance to be measured.

7. A method according to claim 6, wherein said calibration is carried out by measuring a total energy of a pulse reflected from said object.

8. A method according to claim 7, wherein said calibration and said gated energy retrieval are carried out on a single reflected pulse.

9. A method of measuring distance to a target comprising:
   reflecting a pulse off a target,
   retrieving energy from said reflected pulse over a predetermined gating period and measuring a level of said retrieved energy,
   determining a distance of said target by comparing said measured retrieved energy level from said target over said predetermined gating period with a calibration energy level, said pulse comprising light, the method further comprising:
   splitting incoming light into two parts, one part for analysis of said reflected pulse to determine distance information and a second part being used to obtain image information.

10. A method according to claim 9, wherein said image information is color information.

11. Apparatus for determining a distance of a target, said apparatus comprising a pulse transmitter, a gatable beam detector, and a comparator, said gatable beam detector being operable to obtain gated and calibration beam energy information of a pulse transmitted by said beam pulse transmitter for reflection from said target, and to pass said beam energy information to said comparator, thereby to obtain a ratio between said gated and said calibration beam energy, said ratio being inversely proportional to said distance, said pulse beam transmitter being operable to transmit a pulse having a predetermined width, said gatable beam detector being operable to be gated at least twice the predetermined width and at the predetermined width, thereby to produce a total reflected energy of said pulse for said calibration energy, and said gated pulse energy, and two sub-detectors, one gated at said at least twice the predetermined width and the other gated at said predetermined width.

12. Apparatus according to claim 11, further comprising a beam splitter for splitting said reflected pulse between said first and said second sub-detectors.

13. Apparatus according to claim 11, further comprising a beam splitter for splitting light incoming to said apparatus between a first sub-detector gated to obtain distance information and a second sub-detector for obtaining general image information.

14. Apparatus according to claim 11, wherein said detector is part of an array of detectors.

15. Apparatus according to claim 14, wherein said array is a three-dimensional array.

* * * * *